United States Patent
Sawaki et al.

(10) Patent No.: US 7,449,235 B2
(45) Date of Patent: Nov. 11, 2008

(54) COMPOSITE INDIUM OXIDE PARTICLE WHICH CONTAINS TIN (SN) AND ZINC (ZN), METHOD FOR PRODUCING SAME, CONDUCTIVE COATING MATERIAL, CONDUCTIVE COATING FILM, AND CONDUCTIVE SHEET

(75) Inventors: Yuko Sawaki, Kyoto (JP); Mikio Kishimoto, Moriya (JP)

(73) Assignee: Hitachi Maxell, Ltd., Osaka (JP)

( * ) Notice: Subject to any disclaimer, the term of this patent is extended or adjusted under 35 U.S.C. 154(b) by 292 days.

(21) Appl. No.: 10/551,188

(22) PCT Filed: Mar. 31, 2004

(86) PCT No.: PCT/JP2004/004655

§ 371 (c)(1),
(2), (4) Date: Sep. 29, 2005

(87) PCT Pub. No.: WO2004/089829

PCT Pub. Date: Oct. 21, 2004

(65) Prior Publication Data

US 2006/0266980 A1    Nov. 30, 2006

(30) Foreign Application Priority Data

Apr. 1, 2003   (JP) ............................. 2003-098612
Jun. 10, 2003  (JP) ............................. 2003-165506

(51) Int. Cl.
  *B32B 5/16*    (2006.01)
  *C01G 9/02*    (2006.01)
  *C01G 19/02*   (2006.01)
(52) U.S. Cl. ................. 428/402; 106/425; 428/328; 428/403; 423/593.1; 423/594.9; 423/594.14; 423/624

(58) Field of Classification Search ................. 423/402, 423/403, 328, 593.1, 594.9, 594.14, 624; 106/425
See application file for complete search history.

(56) References Cited

U.S. PATENT DOCUMENTS 6,656,588 B1 * 12/2003 Laine et al. ................. 428/402
2006/0216224 A1 * 9/2006 Watanabe et al. ........... 423/624

FOREIGN PATENT DOCUMENTS

JP        60-253112 A    12/1985

(Continued)

*Primary Examiner*—H. T Le
(74) *Attorney, Agent, or Firm*—Birch, Stewart, Kolasch & Birch, LLP (57) ABSTRACT

An aqueous alkaline solution containing a tin salt dissolved therein is mixed with a zinc compound, and an aqueous solution of an indium salt is added to the mixture. The resultant hydroxide or hydrate containing tin, indium and zinc is treated by heating at a temperature of 110 to 300° C. in the present of water. Then, the resultant product is filtered, dried and treated by heating at a temperature of 300 to 1,000° C. in an air and further reduced at a temperature of 150 to 400° C. under a reducing atmosphere to obtain composite indium oxide particles of zinc oxide and tin-containing indium oxide, which have an average particle size of 5 to 100 nm. The resultant composite particles of zinc oxide and tin-containing indium oxide are suitably used to form a transparent conductive coating film having a UV-shielding effect.

16 Claims, 3 Drawing Sheets

FOREIGN PATENT DOCUMENTS

| | | |
|---|---|---|
| JP | 62-7527 A | 1/1987 |
| JP | 3-33185 A | 2/1991 |
| JP | 5-201731 A | 8/1993 |
| JP | 6-338213 A | 12/1994 |
| JP | 2000-119018 A | 4/2000 |
| JP | 2001-332134 A | 11/2001 |
| JP | 2002-167576 A | 6/2002 |
| JP | 2002-179948 A | 6/2002 |
| JP | 2002-201382 A | 7/2002 |

\* cited by examiner

COMPOSITE INDIUM OXIDE PARTICLE WHICH CONTAINS TIN (SN) AND ZINC (ZN), METHOD FOR PRODUCING SAME, CONDUCTIVE COATING MATERIAL, CONDUCTIVE COATING FILM, AND CONDUCTIVE SHEET

FIELD OF THE INVENTION

The present invention relates to composite indium oxide particles comprising zinc oxide and tin-containing indium oxide and a process for manufacturing the same, and a conductive coating composition, a conductive coating film and a conductive sheet, each comprising such composite particles.

BACKGROUND OF THE INVENTION

As materials for transparent conductive coating compositions, there are known tin oxide particles, antimony-containing tin oxide particles, tin-containing indium oxide particles, zinc oxide particles substituted by aluminum, etc. Among these materials, tin-containing indium oxide particles are used for coatings applied to the screens of cathode-ray tubes (CRT) and liquid crystal displays (LCD) which are required to have antistatic properties and electromagnetic wave-shielding properties, because the tin-containing indium oxide particles have high translucency to visible light and high electric conductivity. Further, sheets having the tin-containing indium oxide particles dispersed and applied thereon are used for not only displays but also a wide variety of other applications such as touch panels, because of their translucency and conductivity.

However, the properties of coating films comprising the tin-containing indium oxide particles are inferior to tin-containing indium oxide films formed by a vapor deposition process or a sputtering process, and thus, the application of such coating films has been limited, because the advantage that the coating films can be formed by a relatively simple and inexpensive method, i.e., coating, has not been fully utilized. The tin-containing indium oxide particles have another problem in the higher cost of raw materials since indium as a main raw material is expensive.

On the other hand, zinc oxide particles, titanium oxide particles, cerium oxide particles, iron oxide particles, etc. are known as materials for UV-shielding or highly refractive coating compositions. Among these materials, zinc oxide particles show superior shielding properties to UV rays within the region of UV-A, and particularly show high transparency to visible light. Therefore, the zinc oxide particles are used as UV-shielding cosmetic materials and are further used as highly refractive materials because of their high refractive index (2.1).

When these transparent particles such as tin-containing indium oxide particles and zinc oxide particles are dispersed in a binder for application, it is needed that the particle size thereof should be generally at most a half of the wavelength of visible light in order to obtain high transparency to visible light. Accordingly, in order to be transparent to, for example, visible light, these particles should have a particle size of as small as 200 nm or less.

One of typical methods for manufacturing such fine particles is disclosed in JP-A-62-7627. According to this method, an aqueous alkaline solution such as an aqueous ammonia, an aqueous ammonium carbonate solution or the like is added to an aqueous solution of a mixture of indium chloride and tin chloride to form a co-precipitated hydroxide; the co-precipitated hydroxide is then treated by heating to form tin-containing indium oxide; the tin-containing indium oxide is mechanically ground to obtain fine particles thereof. In the method of JP-A-62-7627, tin-containing indium oxide particles having an average particle size of 0.1 μm are obtained by the heat treatment and the mechanical grinding.

According to JP-A-5-201731, the co-precipitated hydroxide of indium and tin is obtained in the same manner as in JP-A-62-7627, and then is baked and ground to obtain tin-containing indium oxide particles, while it is important in this method that the contents of sodium and potassium should not be larger than a specified amount in order that the resultant particles can have high conductivity. In the method of JP-A-5-201731, tin-containing indium oxide particles having a particle size of 0.01 to 0.03 μm are obtained after the grinding.

On the other hand, it is known that zinc oxide fine particles themselves have strong coagulating power and thus are hard to disperse. In order to improve the dispersibility of zinc oxide fine particles, a very small amount of an oxide or an hydroxide of silicon or aluminum is contained into the respective zinc oxide particles (see JP-A-201382). Thereby, zinc oxide particles having a particle size of not larger than 0.03 μm and having sufficient dispersibility are obtained.

For example, these transparent conductive particles and UV-shielding and highly refractive particles are used for anti-reflection films having excellent antistatic effect. While a conventional anti-reflection film of this type is obtained by laminating a plurality of layers having individual functions, recently, an anti-reflection film having a plurality of functions in a single layer structure is desired in association with the development of a variety of thin-shaped appliances. For example, JP-A-2002-16757 discloses such a single-layer film. In this publication, a highly refractive and conductive material is obtained by dispersing, in a binder, conductive fine particles which comprise indium oxide and tin oxide as main components and highly refractive particles which comprise titanium oxide and zinc oxide. In this method, it is necessary that the sizes of the particles should not be larger than 0.2 μm, and the thickness of a coating film should not be larger than 20 μm in order to maintain the transparency of the film and the dispersibility of the particles. In Example 1 of this publication, a coating composition is prepared by mixing and dispersing tin-containing indium oxide particles and cerium oxide particles, and a coating film having a refractive index of 1.68 and a surface resistance of $2.5 \times 10^9$ Ω/□ is formed by applying this coating composition.

In the above mixture dispersion system of conductive particles and non-conductive particles, the non-conductive particles are held between the conductive particles by mixing and dispersing the non-conductive particles and the conductive particles, so that the contacts between each of the conductive particles are decreased. As a result, the electric conductivity of the resultant coating film tends to lower. This is one of the essential features of the mixture dispersion systems of this type. As for the antistatic effect alone, a coating film having a surface resistivity of about $10^9$ Ω/□ has sufficient conductivity, in other words, an antistatic function, and is expected to have further functions such as an electromagnetic wave-shielding property, or conductivity so high as to be applicable to a touch panel or the like. However, to obtain such excellent conductivity, it is needed to increase the content of conductive particles of tin-containing indium oxide or the like as much as possible. However, disadvantageously, an increase of the content of the conductive particles leads to a decrease of the content of non-conductive particles such as zinc oxide or the like. As a result, the UV-shielding effect, i.e., one of the features of the zinc oxide is hardly exhibited. In this way, there is a relationship of trade-off between the conductivity and the UV-shielding function.

In these years, there is an increased demand for antistatic coating compositions comprising white conductive particles, for use in white garment and the interior decoration of clean rooms required to have cleanliness, or bright and vivid color coating compositions or plastic products. Examples of the white conductive particles for use in these applications are white inorganic pigment particles each of which comprises a core of potashmica coated with tin-containing indium oxide (JP-A-60-253112), white conductive particles each of which comprises a white inorganic pigment particle of zinc oxide, titanium oxide or the like, coated with tin dioxide and further coated with tin-containing indium oxide (JP-A-06-338213), etc. Some of these white conductive particles are manufactured by coating the outer surfaces of UV-shielding white pigment particles of titanium oxide or zinc oxide as cores with conductive tin oxide, tin-containing indium oxide or the like. Theses particles are manufactured for the purpose of obtaining white colors but are not used as UV-shielding agents. Further, because of the influence of the white inorganic pigment particles as base substances, it is difficult to sufficiently lower the volume resistivity of the particles to a level necessary for use in conductive coating composition or the like.

DISCLOSURE OF THE INVENTION

To form a coating film containing the above-described metal oxide particles, usually, the particles of this kind are dispersed in a solvent containing an inorganic or organic binder dissolved therein, and the resultant coating composition is applied on a variety of substrates. In order for the resultant coating film to have transparency, the particles to be used should be very fine, and simultaneously should be uniformly dispersed in the coating film. However, such fine particles tend to form secondary coagulations in the coating composition, which makes it difficult to obtain an uniform dispersion. Such coagulations in the coating composition not only lower the conductivity of the resultant coating film but also degrade the transparency thereof.

Under the above-discussed circumstances, an object of the present invention is to provide composite indium oxide particles having excellent dispersibility, as novel fine particles having transparency, conductivity and UV-shielding properties, for use in coating films, and further as fine particles for use in coating type transparent and conductive films which can be manufactured at lower cost by decreasing the amount of indium, and another object of the invention is to provide methods for manufacturing the same. A further object of the present invention is to provide a conductive sheet or the like having excellent transparency, conductivity and UV-shielding properties, by using the same composite indium oxide particles.

As a result of the present inventors' extensive researches for achieving the above objects, they have found the following: composite indium oxide particles having an average particle size of 5 to 100 nm, which substantially consist of zinc oxide and tin-containing indium oxide and which is manufactured by coating the zinc oxide as a core with the tin-containing indium oxide, have transparency and conductivity derived from the tin-containing indium oxide particles, and UV-shielding properties derived from the zinc oxide, and further excellent dispersibility, in spite of the fact that the amount of indium used is smaller than that used in any of the conventional tin-containing indium oxide particles; namely, fine particle materials suitable for use in coating films or coating type transparent conductive films can be obtained.

The use of the particles having an average particle size of less than 5 nm is undesirable, because such particles are hard to disperse in the preparation of a coating composition by using the same, and because the manufacturing of such particles is difficult. The use of the particles having an average particle size exceeding 100 nm is also undesirable, because the resultant coating film is hard to ensure transparency to visible light.

Preferably, the composite indium oxide particles of the present invention are composite particles of zinc oxide and tin-containing indium oxide in which the zinc oxide and the tin-containing indium oxide keep their own crystalline structures, respectively. Preferably, compressed powder of such composite particles shows a volume resistivity of $10^{-3}$ to 10 $\Omega$cm under a pressure of 14.7 MPa (150 kgf/cm$^2$).

The present inventors further have found that the conductivity of the composite indium oxide particles can be further improved by a unique and specific method which the present inventors have developed by themselves, wherein a part of at least one metal of the constituent metals of the tin-containing indium oxide and the zinc oxide is substituted by a trivalent element such as aluminum, gallium, boron, thallium or the like, preferably aluminum or gallium, and such a trivalent element is contained in the composite particle to obtain a composite indium oxide particle of the chemical formula:

wherein A represents a trivalent element such as Al, Ga or the like, and that this composite indium oxide particle is further improved in conductivity.

Furthermore, the present inventors have succeeded in manufacturing of composite indium oxide particles which have an average particle size of 5 to 100 nm as mentioned above, and which comprise zinc oxide and tin-containing indium oxide, by a novel manufacturing process which is quite different from any of the conventional processes.

The process of the present invention comprises the steps of preparing an aqueous alkaline solution by adding a zinc compound (or a zinc compound elementarily substituted by aluminum, gallium or the like) to an aqueous alkaline solution containing a tin salt dissolved therein, and, if the tin-containing indium oxide phase is elementarily substituted by aluminum, gallium or the like, adding an aluminum compound, a gallium compound or the like thereto; adding an aqueous solution of an indium salt to the above aqueous alkaline solution; adjusting the pH of the resultant suspension containing precipitates of a zinc compound coated with a hydroxide or hydrate of tin and indium, to 4 to 12; treating the suspension by heating at a temperature of 110 to 300° C. in the presence of water; filtering and drying the resultant particles; treating the resultant particles by heating at a temperature of 300 to 1,000° C. in an air; and reducing the resultant particles at a temperature of 150 to 400° C. under a reducing atmosphere. Thus, the above composite indium oxide particles which are composite particles of zinc oxide and tin-containing indium oxide are manufactured.

The composite indium oxide particles obtained by the process of the present invention have a significant feature in that they have UV-shielding properties in addition to transparency and conductivity. This is considered to be induced as follows: by coating zinc oxide with tin-containing indium oxide, electrons flow along the tin-containing indium oxide formed on the surfaces of the particles so that the excellent conductivity of the tin-containing indium oxide is exhibited, and light passes through a whole of the particles, so that the excellent UV-shielding property of the zinc oxide is exhibited. As a result, it becomes possible for one kind of the particle to concurrently exhibit transparency, conductivity and UV-shielding property.

Furthermore, the composite particles of the present invention can be manufactured at lower cost, because indium is used in a smaller amount. The conventional tin-containing indium oxide particles as transparent conductive materials are expensive, and thus have not been widely used, whereas the composite particles of the present invention can be manufactured at lower cost since the amount of indium can be decreased by 20 to 80%, while the conductivity thereof is being kept equal to or higher than that of the conventional tin-containing indium oxide particles.

According to the present invention, by compounding zinc oxide and tin-containing indium oxide (more preferably by coating zinc oxide with tin-containing indium oxide), fine particles having transparency and conductivity derived from the tin-containing indium oxide and also UV-shielding properties and transparency derived from the zinc oxide can be provided. In this case, by substituting any of the metal elements of the zinc oxide and the tin-containing indium oxide with aluminum, gallium or other element, the composite particles can have improved conductivity while maintaining the transparency and the UV-shielding properties. This feature can not be obtained from the conventional particles as a mixture of transparent conductive particles and UV-shielding particles, and this feature can be firstly realized by the composite particles of the present invention. The composite indium oxide particles obtained in the present invention are most suitable as conductive particles for use in transparent conductive coating films capable of exhibiting UV-shielding effect. In this sense, the industrially applicable values of the present invention are very significant.

As described above, the composite indium oxide particles of the present invention can be obtained by compounding zinc oxide and tin-containing indium oxide (more preferably compounding by coating zinc oxide with tin-containing indium oxide). Thereby, the amount of indium used can be remarkably decreased, and the cost can be decreased by the decreased amount of indium. In addition, the composite indium oxide particles of the present invention have excellent UV-shielding properties which are the characteristics of zinc oxide, while maintaining excellent conductivity. Accordingly, coating compositions of the present invention comprising such composite particles, coating films of the present invention formed of the same coating compositions, and conductive sheets of the present invention obtained by forming the same coating films on the surfaces of transparent sheet-form substrates have excellent transparency, conductivity and UV-shielding properties.

According to the manufacturing process of the present invention, the above mentioned composite indium oxide particles having an average particle size of 5 to 100 nm can be obtained, wherein each composite particle comprises zinc oxide coated with tin-containing indium oxide. Such composite indium oxide particles are novel functional particles which have been firstly developed in the present invention.

MOST PREFERRED EMBODIMENT FOR WORKING THE INVENTION

The manufacturing process of the present invention is carried out as follows: in the first step, a zinc compound, or a zinc compound substituted by an element such as aluminum, gallium or the like is added and mixed into an aqueous alkaline solution containing a tin salt previously dissolved therein; and an aqueous solution of an indium salt is added to the aqueous solution of the tin salt which contains the zinc compound. When the tin-containing indium oxide phase in a composite indium oxide particle as a final product is substituted by an element such as aluminum, gallium or the like, an aluminum compound, a gallium compound or the like is further added and mixed to prepare an aqueous alkaline solution, to which an aqueous solution of an indium salt is added. In this step, a zinc compound coated with a hydroxide or hydrate of tin and indium is obtained. Preferably, by adding an indium salt, the pH of a suspension containing precipitates of the zinc compound coated with the hydroxide or hydrate of tin and indium is adjusted to 4 to 12.

Next, this zinc compound coated with the hydroxide or hydrate of tin and indium is treated in an autoclave or the like by heating at a temperature of 110 to 300° C. in the presence of water, to regulate the particles to a desired particle shape with a desired particle size.

In the second step, the zinc compound coated with the hydroxide or hydrate of tin and indium is treated by heating in an air so as to be reduced with hydrogen gas. Thus, composite indium oxide particles which have a uniform particle size distribution and which are hardly sintered or coagulated are obtained.

The present inventors have firstly succeeded in the development of the composite indium oxide particles having an average particle size of 5 to 100 nm, based on an inspired conception that the step for regulating the shapes and particle sizes of the particles is carried out separately from the step for extracting the intrinsic physical properties of the materials as much as possible, in the course of manufacturing the composite indium oxide particles, i.e., the composite particles of zinc oxide and tin-containing indium oxide.

A coating film comprising the composite indium oxide particles of the present invention manufactured by the above steps exhibits excellent performance, i.e., concurrently have high transparency and conductivity, and UV-shielding properties, which have not been achieved by any of the conventional coating films.

Hereinafter, the process for manufacturing the composite indium oxide particles of the present invention will be described in more detail.

(Formation of Precipitates)

An indium salt such as indium chloride, indium nitrate, indium sulfate or the like is dissolved in water to prepare an aqueous solution containing indium ions. Among these indium salts, indium chloride is most preferable to obtain fine composite indium oxide particles.

Separately, an alkaline solution containing tin ions is mixed with a zinc compound or an elementarily substituted zinc compound to prepare a solution. In detail, an alkali such as sodium hydroxide, potassium hydroxide, lithium hydroxide, an aqueous ammonia solution or the like is dissolved in water, and then, a tin salt such as tin chloride, tin nitrate, tin sulfate or the like is dissolved in the resultant aqueous alkaline solution. Further, a zinc compound such as zinc hydroxide, zinc oxide or the like, or an elementarily substituted zinc compound such as zinc hydroxide, zinc oxide or the like substituted by a trivalent element such as aluminum, gallium or the like is mixed with the above solution to prepare an alkaline solution. Among the above tin salts, tin chloride is most preferable to obtain fine composite indium oxide particles.

In this step, this alkaline solution may be mixed with an aluminum compound such as aluminum hydroxide, aluminum oxide or the like, or a gallium compound such as gallium hydroxide, gallium oxide or the like. By this mixing, a part of the tin atoms or indium atoms in the tin-containing indium oxide phase in the composite indium oxide particles as a final product are substituted by a trivalent element such as aluminum, gallium or the like, to further improve the conductivity of the particles.

To improve the conductivity and the UV-shielding effect of the composite indium oxide particles as the final product, the concentration of the zinc compound to be mixed is controlled so that the concentration of the zinc oxide in the composite indium oxide particles can be 5 to 70 mol %, preferably 10 to 50 mol %, and that the concentration of the tin in the tin-containing indium oxide phase can be preferably 3 to 30 mol %, more preferably 5 to 15 mol %.

To further improve the conductivity of the composite particles, the concentration of the trivalent element in the composite indium oxide particles is preferably not larger than 30 mol %, when the trivalent element such as aluminum, gallium or the like is contained in the zinc oxide phase by way of substitution. Specifically, the concentration of the trivalent element in the zinc oxide phase is 0 to 30 mol %, preferably 2 to 15 mol % based on the mole of the zinc oxide, and the concentration of the trivalent element in the tin-containing indium oxide phase is 0 to 10 mol %, preferably 2 to 5 mol % based on the mole of the tin-containing indium oxide. In this regard, the wording "0 to X mol %" seen in the description and the claims of the present specification means that the lower limit "0 mol %" is not included, and that the upper limit "X mol %" is included, unless otherwise specified.

This is described below. In the composite indium oxide particle represented by the formula: $[(Zn_{1-y}A_y)O]_{1-x}[(ITO)_{1-z}A_z]_x$, the respective concentrations are preferably controlled as follows: the concentration of the zinc oxide or the elementarily substituted zinc oxide (the concentration being represented by "1-x" in the above formula) is 5 to 70 mol %; the total content of the element A which is a trivalent element such as aluminum, gallium or the like, and which is contained in the zinc oxide and the tin-containing indium oxide by way of the substitution is not larger than 30 mol %; the concentration of the element A in the zinc oxide (represented by "y" in the above formula) is 0 to 30 mol %; the concentration of the element A in the tin-containing indium oxide (represented by "z" in the above formula) is 0 to 10 mol %; and the concentration of tin in ITO is 3 to 30 mol %. In this case, the concentration of the zinc oxide, (1-x), smaller than the lower limit of the above range does not influence the conductivity but degrades the UV-shielding effect. This concentration larger than the upper limit of the above range does not influence the UV-shielding effect but markedly degrades the conductivity. When the total content of the trivalent element(s) to be added to improve the conductivity is larger than the above specified value, the conductivity of the composite particles, on the contrary, tends to lower, or the trivalent elements separate since they are not completely used for the substitution. As a result, for example, aluminum oxide is formed in the final product, so that particles of a mixture are provided. The concentration of tin in the tin-containing indium oxide smaller than the lower limit of the above range makes it impossible to obtain sufficient conductivity. On the contrary, the concentration of tin in the tin-containing indium oxide larger than the upper limit of the above range impairs the conductivity.

To contain the trivalent element in the composite particle, at least one oxide of the internal zinc oxide and the tin-containing indium oxide formed on the surface of the zinc oxide is substituted by this trivalent element to introduce the trivalent element into the above oxide. To more effectively improve the conductivity, the trivalent elements are contained in both the oxides by way of substitution. Preferably, aluminum is contained in the composite particle as the trivalent element.

Hydroxyalkylamine may be added to the above alkaline solution. Hydroxyalkylamine acts as a pH buffer within the alkaline region, and simultaneously acts as a crystal growth-controlling agent. Examples of hydroxyalkylamine for use in this case include monoethanolamine, triethanolamine, isobutanolamine, propanolamine and the like, among which monoethanolamine acting also as a crystal growth-inhibiting agent is most preferable to obtain fine particles.

Next, the above aqueous solution of indium salt is added dropwise to the above alkaline solution to form a zinc compound (precipitate) coated with a hydroxide or hydrate of tin and indium. The pH of the suspension containing this precipitate is adjusted to 4 to 12, and the resulting suspension is preferably aged at a temperature of 10 to 50° C. for 10 to 100 hours. The pH adjustment and the aging are effective to obtain composite indium oxide particles at a relatively low treating temperature in the subsequent hydrothermal treatment. When the aging time is shorter than 10 hours, the effect of aging is poor. On the other hand, when the aging time is longer than 100 hours, so serious influence is not given the suspension, but such long aging is meaningless since the effect of aging is saturated.

(Hydrothermal Treatment)

The suspension containing the zinc compound coated with the hydroxide or hydrate of tin and indium is subjected to a hydrothermal treatment in an autoclave or the like. By washing the suspension containing the above precipitate with water in this hydrothermal treatment, products and residues other than the precipitate are removed. After that, the pH of the suspension may be again adjusted with NaOH or the like. The pH of the suspension in this adjustment is preferably within a range of 4 to 12. When the pH is lower than the lower limit, tin hydroxide is again dissolved in the hydrothermal treatment. When the pH is too high, the particle size distribution of the resultant particles becomes wider, or tin, zinc and indium and further aluminum are not compounded by the re-dissolution thereof, so that a compound may be formed.

The temperature for the hydrothermal treatment is preferably in the range of 110 to 300° C. When this temperature is lower than the lower limit, sufficient crystal growth of the particles can not be expected. When the temperature is higher than the upper limit, a generated pressure becomes higher for which an expensive apparatus is needed to withstand such a high pressure, resulting in no advantage.

The time required for the hydrothermal treatment is preferably in the range of 1 to 4 hours. When this time is too short, the crystal growth of the particles becomes insufficient. The too long hydrothermal treatment is no use, resulting in higher manufacturing cost, although no particular problem arises therefor.

(Heat Treatment)

The zinc compound coated with the hydroxide or hydrate of tin and indium obtained after the hydrothermal treatment is filtered and dried and then is subjected to a heat treatment. In this step, prior to the filtration, the zinc compound is preferably washed with water so as to adjust the pH of the compound to about 6 to about 9 within the neutral region. This is because the water-soluble Na ions, or the amine-containing substance, if hydroxyalkyl-amine is added, are removed by the washing with water. If the zinc compound retaining such Na ions or such an amine-containing substance is filtered and dried and then is subjected to a heat treatment, the conductivity of the resultant particles tend to lower, and therefore, it is desirable to remove the above Na ions, etc. as much as possible.

Alternatively, the zinc compound coated with the hydroxide or hydrate of tin and indium may be further admixed with a silicon compound such as sodium silicate or the like to carry out a silica treatment. This silica treatment is effective for the composite indium oxide particles as the final product to be kept as fine particles. The composite indium oxide particles are finally coated at their surfaces with silica films by this treatment, and therefore, silica is effective to maintain the fine particles. However, the silica films tend to lower the conductivity of the composite indium oxide particles. Therefore, the amount of the silicon compound to be added is preferably 0.1 to 5 wt. % based on the weight of the composite indium oxide particles.

Next, the zinc compound coated with the hydroxide or hydrate of tin and indium, which has been filtered and dried, is subjected to a heat treatment to obtain composite indium oxide particles. This heat treatment is carried out under an atmosphere of an oxygen concentration of at least 10%. The heating in an air is preferable since it costs lowest. The temperature for the heat treatment is preferably in the range of 300 to 1,000° C. When this temperature is lower than 300° C., the tin of the tin-containing indium oxide for coating is hardly substituted, so that the resultant particle has a mixture-like structure of tin oxide, indium oxide and zinc oxide, or that the hydroxide is left as it is and is not transformed into an oxide. Under such a situation, the resultant particles are hard to obtain sufficient conductivity. When this temperature is too high, the particles are easily sintered, and such particles are not sufficiently dispersed in the preparation of a coating composition. Further, when such a coating composition is used to form a coating film, the transparency of the resultant coating film tends to degrade.

The composite indium oxide particles obtained after the heat treatment are reduced in an atmosphere of 150 to 400° C. to obtain conductive composite indium oxide particles colored yellowish gray or blue-greenish white.

The composite indium oxide particles thus obtained have a particle size of 5 to 100 nm which is within a range particularly preferable for use in transparent conductive films. When the particle size is smaller than 5 nm, the coagulating force among the particles becomes extremely large so that the dispersion of such particles becomes hard. When the particle size is larger than 100 nm, the transparency of the resultant coating film obtained by applying a coating composition having such particles dispersed therein tends to degrade. For these reasons, the average particle size of the composite indium oxide particles is preferably 5 to 100 nm, more preferably 10 to 60 nm.

(Preparation of Coating Composition and Manufacturing of Sheet)

A conductive sheet according to the present invention is manufactured by applying, to a sheet-shaped substrate, a conductive coating composition which is prepared by adding the composite indium oxide particles obtained as above to a solution containing a binder and a solvent, and mixing and dispersing them in each other. Hereinafter, the manufacture of this conductive sheet is described in detail.

For example, a resin film or sheet is used as the substrate. The resin film or sheet may be manufactured by any of known methods. For example, a resin such as a saturated polyester resin, polycarbonate resin, polyacrylate resin, alicyclic polyolefin resin, polystyrene resin, polyvinyl chloride resin, polyvinyl acetate resin or the like is formed into a film or sheet by melt-molding such as extrusion molding, calender molding, compression molding, injection molding or the like; or otherwise, the resin is dissolved in a solvent, and the solution of the resin is cast to form a film or sheet. The thickness of the substrate is preferably about 10 μm to about 5 mm. In this regard, the substrate may contain additives such as an antioxidant, a flame retardant, a heat resisting agent, a UV absorbent, a lubricant, an antistatic agent, etc. To improve the adhesion of the film, the substrate may be provided at its surface with an adhesive layer (or a primer) or may be subjected to any of known surface treatments such as corona treatment, plasma treatment or the like.

A dispersing machine for dispersing the composite indium oxide particles and a binder to form a dispersion is not particularly limited, and a known dispersing machine such as a three-roll mill, a ball mill, a paint shaker, an ultrasonic dispersing machine or the like can be used.

The amount of the composite indium oxide particles in relation to the binder is preferably 50 to 99%, more preferably 70 to 92%, in terms of the weight content of the solids in the coating composition (that is, preferably 100 to 9,900 wt. parts, more preferably 230 to 1,150 wt. parts of the composite indium oxide particles per 100 wt. parts of the binder). When this weight content is lower than 50%, the probability of the mutual contact of the particles deteriorates, which makes it hard to form electrically conductive paths, so that the conductivity of the resultant film becomes lower, and the UV-shielding effect of the film tends lower, since the particles can not have a sufficient physical volume in the film. On the other hand, when the weight content exceeds 99%, the binding power of the binder to the particles becomes lower, so that some of the particles drop or that the resultant film cracks, which leads to a decrease in the adhesion between the coating film and the substrate. As a result, the conductivity of the coating film degrades. In the meantime, when other conductive substance (e.g., a metal such as Au or Ag, metal colloid, carbon nanotubes or the like) is added together with the composite indium oxide particles to the binder, to an extent that the optical properties of the film are not impaired, the weight content of all the conductive substances is also preferably within the above specified range.

As the binder (a polymer binder), all kinds of binders, including aqueous types and non-aqueous types, can be used, so long as the dispersion is not inhibited by any of such binders. Examples of the binder include acrylic resins, polyurethanes, polyvinyl chloride, epoxy resins, polyesters, polyvinyl acetates, polystyrene, cellulose, polyvinyl alcohol and polybutyral, and resins produced by copolymerizing these resins. If needed, there can be used, as the binder, a binder having functional groups, and conductive polymer materials such as polythiophene derivatives (PEDOT), N,N-di(naphthalene-1-nyl)-N,N-diphenyl-benzidene derivatives (NPB), poly[2-methoxy-5-(2'-ethylhexyloxy)-1,4-phenylenevinylene] (MEH-PPV) and the like. Further, a known dispersant, surfactant, leveling agent, etc. may be added to the binder, so as to improve the stability of the resultant coating composition, so long as the optical properties and conductivity of the film are not impaired by these additives.

Examples of the solvent for use in the conductive coating composition include ketones such as acetone, methyl ethyl ketone, methyl isobutyl ketone, diisobutyl ketone, cyclohexanone, isophorone, tetrahydrofuran and the like; alcohols such as methanol, ethanol, propanol, butanol, isobutanol, isopropanol, methylcyclohexanol and the like; esters such as methyl acetate, butyl acetate, isobutyl acetate, isopropyl acetate, ethyl lactate, glycol acetate and the like; glycol esters such as glycoldimethylether, glycolmonoethylether, dioxane and the like; aromatic hydrocarbons such as benzene, toluene, xylene, cresol, chlorobenzene and the like; chlorinated hydrocarbons such as methylene chloride, ethylene chloride, carbon tetrachloride, chloroform, ethylene chlorohydrine, dichlorobenzene and the like; N,N-dimethylformamide; hexane; and the like. Each of these solvents may be used alone or as a mixture with others selected therefrom in an optional ratio.

A conductive sheet having an UV-shielding, transparent and conductive coating film on its surface (a transparent conductive sheet in case where a transparent substrate is used) can be obtained by applying the above coating composition comprising the composite indium oxide particles, the binder and the solvent, on a sheet-form substrate. The coating composition may be applied by any of the known coating methods (roll coating, die coating, air knife coating, blade coating, spin coating, reverse coating, gravure coating, micro-gravure coating or the like) or by any of known printing methods (gravure printing, screen printing, off-set printing, ink jet printing or the like).

The dry thickness of the coating film is preferably 50 nm to 15 μm, more preferably 500 nm to 5 μm. When this thickness is less than 50 nm, the coating film can not obtain sufficient conductivity and UV-shielding effect. When it exceeds 15 μm, the transmittance of the coating film to visible light becomes poor, so that, undesirably, the coating film tends to have lower transparency or tends to crack.

The conductivity and visible light transmittance of the coating film can be improved by calendering the coating film. In this case, the calendering is carried out at a rate of 1 to 30 m/min. and at a heat-treating temperature within a range of Tg±50° C. (Tg: the glass transition temperature of the resin used as the binder) under a pressure of $9.8 \times 10^4$ to $9.8 \times 10^6$ Pa (1 to 100 kg/cm$^2$).

Hereinafter, the Examples of the present invention and Comparative Examples will be illustrated. In the following Examples and Comparative Examples, the unit "part(s)" indicates "wt. part(s)", unless otherwise specified.

EXAMPLE 1

(Preparation of Composite Indium Oxide Particles)

Sodium hydroxide (15.4 g) was dissolved in water (800 ml), and tin (IV) chloride pentahydrate (3 g) was dissolved in this alkaline solution to form an aqueous alkaline solution. This aqueous alkaline solution was mixed with zinc oxide powder (13 g). Separately, indium (III) chloride tetrahydrate. (35 g) was dissolved in water (400 ml) to form an aqueous solution of indium chloride. This aqueous solution of indium chloride was added dropwise to the former aqueous alkaline solution containing tin ions and zinc oxide to form precipitates of zinc oxide coated with the hydroxide or hydrate of tin and indium. The pH of the precipitates was 8.8. The precipitates in the form of a suspension were aged at a room temperature for about 20 hours.

Next, an aqueous solution of sodium hydroxide was added to the suspension containing the precipitates to readjust the pH of the suspension to 10.0, and this suspension was charged in an autoclave and was subjected to a hydrothermal treatment at 180° C. for 4 hours.

The resulting product of the hydrothermal treatment was filtered and washed until the pH thereof reached 7.8, and then was dried at 90° C. in an air. The dried product was then slightly crushed in a mortar and treated by heating at 600° C. in an air for 2 hours, followed by reduction at 250° C. in a hydrogen atmosphere to obtain composite indium oxide particles which were composite particles of zinc oxide and tin-containing indium oxide.

The shapes of the composite indium oxide particles thus obtained were observed with a transmission electron microscope, and the composite particles were found to have particle sizes of 20 to 30 nm. The composition of the particles was represented by the formula: $(ZnO)_{0.5}(ITO)_{0.5}$ deduced from the charged amounts. The contents of zinc and tin in the composite particle found by fluorescent X-ray analysis were 50 mol % and 5 mol %, respectively, and the concentration of tin in ITO was 10 mol %.

Figure 1:
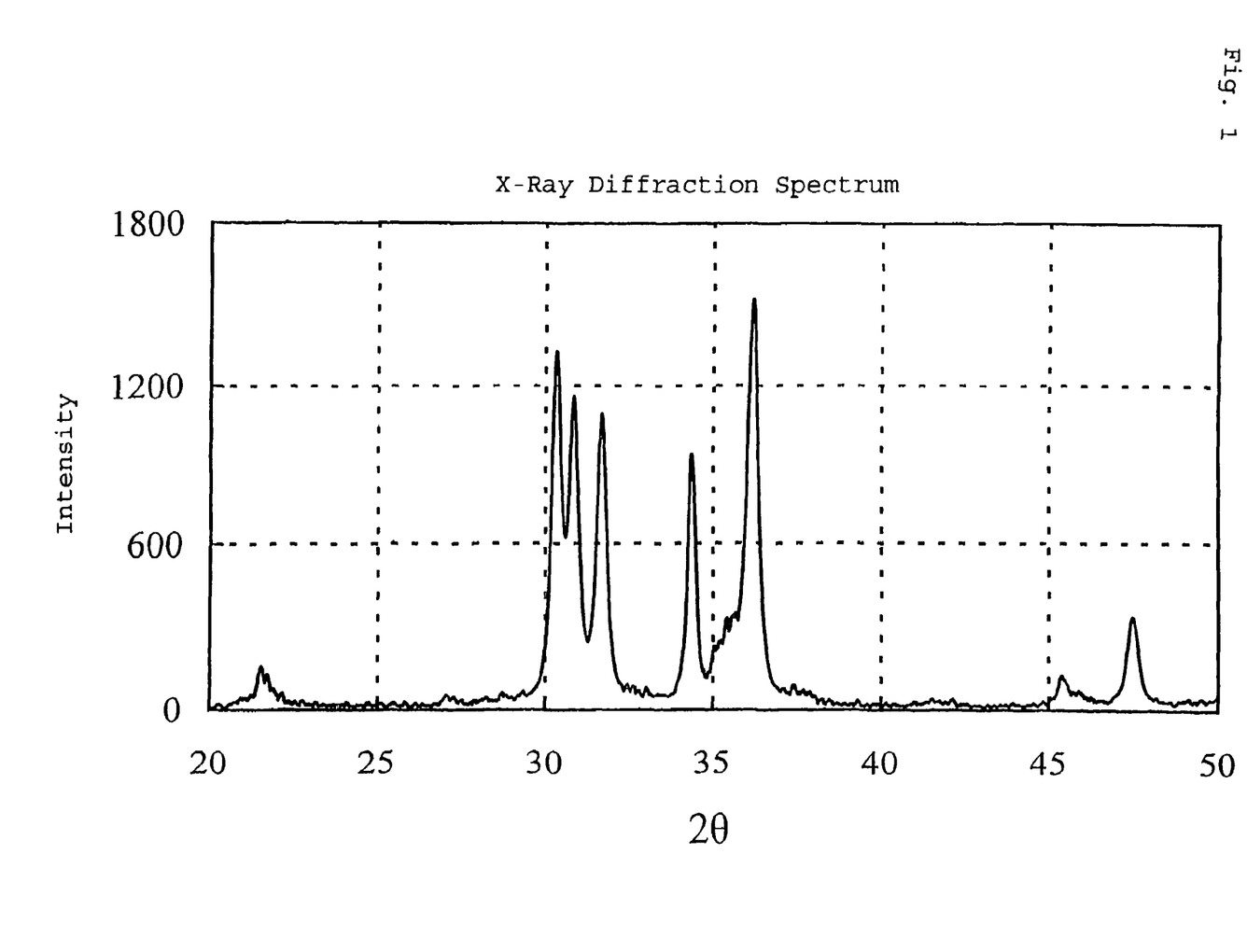
FIG. 1 shows the X-ray diffraction spectrum of the composite indium oxide particles of zinc oxide and tin-containing indium oxide, obtained in Example 1, which contained zinc oxide at a concentration of 50 mol %.
Figure 2:
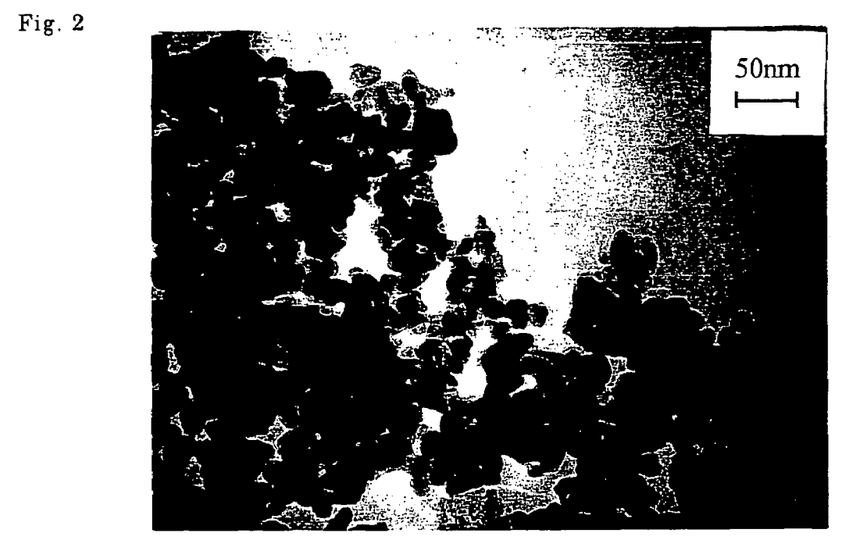
FIG. 2 shows the transmission electron micro-photograph (magnification: 300,000) of the composite particles of zinc oxide and tin-containing indium oxide, obtained in Example 1, which contained zinc oxide at a concentration of 50 mol %.

FIG. 1 shows the X-ray diffraction spectrum of the composite indium oxide particles, and FIG. 2 shows the transmission electron microphotograph of the same particles at a magnification of 300,000 times. The particles shown in the transmission electron microphotograph have uniform shapes, while the X-ray diffraction spectrum indicates that the particle comprises two phases of indium oxide and zinc oxide, and it is understood that the tin-containing indium oxide coats the zinc oxide.

(Formation of Coating Film)

Next, a coating composition was prepared using the above composite indium oxide particles. The following components were stirred and mixed, and the mixture was dispersed with a paint shaker for 25 minutes to prepare the coating composition.

| | |
|---|---|
| Composite indium oxide particles | 85 parts |
| Polymethyl methacylate | 15 parts |
| (BR113 manufactured by Mitsubishi Rayon Co., Ltd.) | |
| Methyl ethyl ketone | 50 parts |
| Toluene | 50 parts |

The resultant coating composition was applied to a transparent sheet-form substrate made of polyethylene terephthalate (PET) with a bar coater so that the thickness of the resulting coating layer could have a thickness of 3 μm after being dried. The coating layer was dried to obtain a conductive sheet having an UV-shielding conductive coating film formed on its surface.

EXAMPLE 2

An aqueous alkaline solution was prepared by mixing a zinc oxide elementarily substituted by aluminum (10 mol % based on the mole of zinc) instead of the zinc oxide, in the course of the synthesis of the composite indium oxide particles of Example 1. Except for this step, composite indium oxide particles were prepared in the same manners as in Example 1, that is, precipitates containing the zinc oxide elementarily substituted by aluminum, coated with the hydroxide or hydrate of tin and indium, were formed, washed with water, filtered and dried, followed by a heat treatment and reduction, to obtain the composite indium oxide particles. The composition of this particle is represented by the formula: $[(Zn_{0.9}Al_{0.1})O]_{0.5}(ITO)_{0.5}$ deduced from the charged amounts. The contents of zinc, aluminum and tin in the particle, found by fluorescent X-ray analysis, were 45 mol %, 5 mol % and 5 mol %, respectively, and the concentration of tin in ITO was 10 mol %.

The X-ray diffraction spectrum of the composite indium oxide particles was obtained, and it was found that the particle comprised two phases of tin-containing indium oxide and zinc oxide elementarily substituted by aluminum. The particles were observed with a transmission electron microscope, and it was found that the particles had uniform shapes having particle sizes of 20 to 30 nm, like those of Example 1. From these facts, it was understood that the tin-containing indium oxide coated the zinc oxide elementarily substituted by aluminum, like Example 1.

Next, a conductive sheet having a conductive coating film with a thickness of 3 μm (in the dried state) formed on its surface was manufactured using the composite indium oxide particles, in the same manner as in Example 1.

EXAMPLE 3

An aqueous alkaline solution was prepared by adding sodium hydroxide (24.7 g) to water (800 ml), and dissolving tin (IV) chloride pentahydrate (4.8 g) in this alkaline solution, in the course of the synthesis of the composite indium oxide particles of Example 1. This aqueous alkaline solution was mixed with zinc oxide (5 g) elementarily substituted by aluminum (10 mol % based on the mole of zinc) instead of the zinc oxide powder (13 g). Separately, indium (III) chloride tetrahydrate (56.1 g) was dissolved in water (400 ml) to form an aqueous solution of indium chloride. After that, composite indium oxide particles were prepared in the same manners as in Example 1, that is, precipitates containing the zinc oxide elementarily substituted by aluminum, coated with the hydroxide or hydrate of tin and indium, were formed, washed with water, filtered and dried, followed by a heat treatment and reduction, to obtain the composite indium oxide particles. The composition of this particle is represented by the formula: $[(Zn_{0.9}Al_{0.1})O]_{0.2}(ITO)_{0.8}$ deduced from the charged amounts. The contents of zinc, aluminum and tin in the particle, found by fluorescent X-ray analysis, were 18 mol %, 2 mol % and 8 mol %, respectively, and the concentration of tin in ITO was 10 mol %.

The X-ray diffraction spectrum of the composite indium oxide particles was obtained, and it was found that the particle comprised two phases of the tin-containing indium oxide and the zinc oxide elementarily substituted by aluminum. The particles were observed with a transmission electron microscope, and it was found that the particles had uniform shapes having particle sizes of 20 to 30 nm, like those of Example 1. From these facts, it was understood that the tin-containing indium oxide coated the zinc oxide elementarily substituted by aluminum, like Example 1.

Next, a conductive sheet having a conductive coating film with a thickness of 3 μm (in the dried state) formed on its surface was manufactured using the composite indium oxide particles, in the same manner as in Example 1.

EXAMPLE 4

An aqueous alkaline solution was prepared by mixing the alkaline solution with aluminum hydroxide (0.32 g), in the course of the synthesis of the composite indium oxide particles of Example 1. Except for this step, composite indium oxide particles were prepared in the same manners as in Example 1, that is, precipitates containing zinc oxide coated with the hydroxide or hydrate of tin, indium and aluminum were formed, aged, subjected to a hydrothermal treatment, filtered, washed and dried, followed by a heat treatment and reduction to obtain the composite indium oxide particles. The composition of this particle is represented by the formula: $(ZnO)_{0.5}[(ITO)_{0.96}Al_{0.04}]_{0.5}$ deduced from the charged amounts. The contents of zinc, aluminum and tin in the particle, found by fluorescent X-ray analysis, were 50 mol %, 2 mol % and 4.8 mol %, respectively, and the concentration of tin in ITO was 10 mol %.

The composite indium oxide particles were observed with a transmission electron microscope, and it was found that the particles had uniform shapes having particle sizes of 20 to 30 nm. The X-ray diffraction spectrum of the particles was obtained, and it was similar to that of Example 1, and it was found that no independent peak assigned to aluminum was observed. From these facts, it was understood that the tin-containing indium oxide was elementarily substituted by aluminum, and that the zinc oxide was coated with the tin-containing indium oxide substituted by aluminum.

Next, a conductive sheet having a conductive coating film with a thickness of 3 μm (in the dried state) formed on its surface was manufactured using the composite indium oxide particles, in the same manner as in Example 1.

EXAMPLE 5

An aqueous alkaline solution was prepared by mixing the alkaline solution with zinc oxide elementarily substituted by 10 mol % of aluminum instead of the zinc oxide, and further mixing with aluminum hydroxide (0.32 g), in the course of the synthesis of the composite indium oxide particles of Example 1. Except for this step, composite indium oxide particles were prepared in the same manners as in Example 1, that is, precipitates containing the zinc oxide substituted by aluminum, coated with the hydroxide or hydrate of tin, indium and aluminum, were formed, aged, subjected to a hydrothermal treatment, filtered, washed and dried, followed by a heat treatment and reduction, to obtain the composite indium oxide particles. The composition of this particle is represented by the formula: $[(Zn_{0.9}Al_{0.1})O]_{0.5}[(ITO)_{0.96}Al_{0.04}]_{0.5}$ deduced from the charged amounts. The contents of zinc, aluminum and tin in the particle, found by fluorescent X-ray analysis, were 45 mol %, 7 mol % and 4.8 mol %, respectively, and the concentration of tin in ITO was 10 mol %.

The X-ray diffraction spectrum of the composite indium oxide particles was obtained, and it was similar to that of Example 2 were obtained. It was found that no independent peak assigned to aluminum was observed. From these facts, it was understood that the particle comprised two phases of tin-containing indium oxide substituted by aluminum and zinc oxide substituted by aluminum. The particles were further observed with a transmission electron microscope, and it was found that the particles had uniform shapes having particle sizes of 20 to 30 nm. From these facts, it was understood that particles of zinc oxide substituted by aluminum, which were coated with indium oxide substituted by aluminum, were obtained.

Next, a conductive sheet having a conductive coating film with a thickness of 3 μm (in the dried state) formed on its surface was manufactured using the composite indium oxide particles, in the same manner as in Example 1.

EXAMPLE 6

An aqueous alkaline solution was prepared by dissolving sodium hydroxide (24.7 g) in water (800 ml), and then dissolving tin (IV) chloride pentahydrate (4.8 g) in this alkaline solution, in the course of the synthesis of the composite indium oxide particles of Example 1. This aqueous alkaline solution was mixed with zinc oxide (5 g) substituted by aluminum (10 mol % based on the mole of the zinc) instead of the zinc oxide powder (13 g), and further mixed with aluminum hydroxide powder (0.51 g). Separately, an aqueous solution of indium chloride was prepared by dissolving indium (III) chloride tetrahydrate (56.1 g) in water (400 ml). After that, composite indium oxide particles were prepared in the same manners as in Example 1, that is, precipitates containing the zinc oxide substituted by aluminum, coated with the hydroxide or hydrate of tin and indium, were formed, washed with water, filtered and dried, followed by a heat treatment and reduction, to obtain the composite indium oxide particles. The composition of this particle is represented by the formula: $[(Zn_{0.9}Al_{0.1})O]_{0.2}[(ITO)_{0.96}Al_{0.04}]_{0.8}$ deduced from the charged amounts. The contents of zinc, aluminum and tin in the particle, found by fluorescent X-ray analysis, were 18 mol %, 5.2 mol % and 7.7 mol %, respectively, and the concentration of tin in ITO was 10 mol %.

Figure 3:
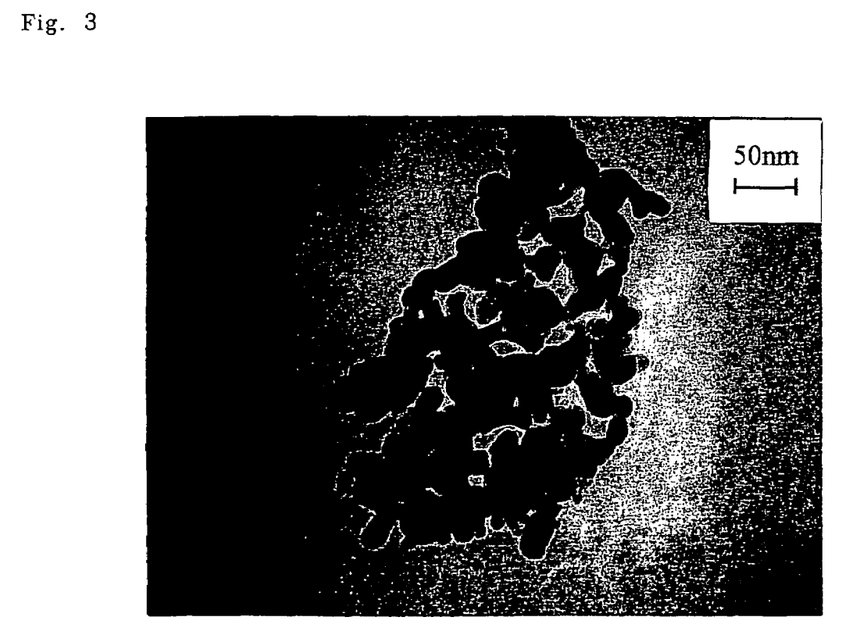
FIG. 3 shows the transmission electron micro-photograph (magnification: 300,000) of the composite particles of zinc oxide and tin-containing indium oxide, obtained in Example 6, which contained zinc oxide at a concentration of 18 mol % and aluminum at a concentration of 5.2 mol %.

The X-ray diffraction spectrum of the composite indium oxide particles was obtained, and it was found that the particle comprised two phases of the tin-containing indium oxide substituted by aluminum and the zinc oxide substituted by aluminum. The particles were further observed with a transmission electron microscope, and it was found that the particles had uniform shapes having particle sizes of 20 to 30 nm, like Example 1. From these facts, it was understood that the particles of the zinc oxide substituted by aluminum were coated with the tin-containing indium oxide substituted by aluminum. The transmission electron microphotograph of the composite indium oxide particles is shown in FIG. 3.

Next, a conductive sheet having a conductive coating film with a thickness of 3 μm (in the dried state) formed on its surface was manufactured using the composite indium oxide particles, in the same manner as in Example 1.

EXAMPLE 7

In the course of the synthesis of the composite indium oxide particles of Example 1, a solution of indium chloride was added dropwise to the aqueous alkaline solution containing tin ions and zinc oxide to form precipitates containing the zinc oxide coated with the hydroxide or hydrate of tin and indium, and the precipitates in the form of a suspension were aged at 90° C., but not a room temperature, for about 20 hours. Next, an aqueous solution of sodium hydroxide was added to the suspension of the precipitates to adjust the pH of the suspension to 13.0 but not 10.0. This suspension was charged in an autoclave and was subjected to a hydrothermal treatment at 180° C. for 4 hours. Except for these steps, composite indium oxide particles were prepared in the same manners as in Example 1, that is, precipitates containing the zinc oxide substituted by aluminum, coated with the hydroxide or hydrate of tin and indium, were formed, washed with water, filtered and dried, followed by a heat treatment and reduction, to obtain the composite indium oxide particles. The composition of this particle, and the contents of zinc, aluminum and tin in the particle, found by the fluorescent X-ray analysis, were the same as those found in Example 1.

The X-ray diffraction spectrum of the composite indium oxide particles was obtained, and it was found that the particle comprised two phases of the tin-containing indium oxide and the zinc oxide substituted by aluminum, like Example 1. The particles were further observed with a transmission electron microscope, and it was found that the particles had uniform shapes having particle sizes of 50 to 60 nm. From these facts, it was understood that the particles of the zinc oxide substituted by aluminum were coated with the tin-containing indium oxide.

Next, a conductive sheet having a conductive coating film with a thickness of 3 μm (in the dried state) formed on its surface was manufactured using the composite indium oxide particles, in the same manner as in Example 1.

EXAMPLE 8

In the course of the synthesis of the composite indium oxide particles of Example 1, an aqueous alkaline solution was prepared by mixing the alkaline solution with zinc oxide substituted by 10 mol % of aluminum but not with zinc oxide, and further mixed with aluminum hydroxide (0.32 g). Precipitates containing zinc oxide substituted by aluminum, coated with the hydroxide or hydrate of tin, indium and aluminum, were formed in the same manner as in Example 1, and the pH of the suspension was adjusted to 5.0. The suspension was aged at a room temperature for 20 hours, and was subjected to a hydrothermal treatment under a condition of pH 5.0, filtered, washed, dried, treated by heating and reduced to obtain composite indium oxide particles. The composition of this particle is represented by the formula: $[(Zn_{0.9}Al_{0.1})O]_{0.5}[(ITO)_{0.96}Al_{0.04}]_{0.5}$ deduced from the charged amounts. The contents of zinc, aluminum and tin in the particle, found by fluorescent X-ray analysis, were 45 mol %, 7 mol % and 4.8 mol %, respectively, and the concentration of tin in ITO was 10 mol %.

The X-ray diffraction spectrum of the composite indium oxide particles was obtained, and it was found that a spectrum similar to that of Example 2 was obtained. From the fact that no independent peak assigned to aluminum was observed, it was found that the particle comprised two phases of the tin-containing indium oxide substituted by aluminum and the zinc oxide substituted by aluminum. The particles were further observed with a transmission electron microscope, and it was found that the particles had uniform shapes having particle sizes of 40 to 50 nm. From these facts, it was understood that the particles of zinc oxide substituted by aluminum were coated with the tin-containing indium oxide substituted by aluminum.

Next, a conductive sheet having a conductive coating film with a thickness of 3 μm (in the dried state) formed on its surface was manufactured using the composite indium oxide particles, in the same manner as in Example 1.

EXAMPLE 9

In the course of the synthesis of the composite indium oxide particles of Example 6, precipitates containing zinc oxide substituted by aluminum, coated with the hydroxide or hydrate of tin and indium, were formed, while maintaining the alkaline solution at 60° C., and the pH of the suspension was adjusted to 5.0. The suspension was aged at a room temperature, and was subjected to a hydrothermal treatment. Except for these steps, the product obtained by the hydrothermal treatment was washed with water, filtered, dried, treated by heating and reduced in the same manners as in Example 6, to obtain composite indium oxide particles. The composition of this particle is represented by the formula: $[(Zn_{0.9}Al_{0.1})O]_{0.2}[(ITO)_{0.96}Al_{0.04}]_{0.8}$ deduced from the charged amounts. The contents of zinc, aluminum and tin in the particle, found by fluorescent X-ray analysis, were 18 mol %, 5.2 mol % and 7.7 mol %, respectively, and the concentration of tin in ITO was 10 mol %.

The X-ray diffraction spectrum of the composite indium oxide particles was obtained, and it was found that the particle comprised two phases of the tin-containing indium oxide substituted by aluminum and zinc oxide substituted by aluminum. The particles were further observed with a transmission electron microscope, and it was found that the particles had uniform shapes having particle sizes of 40 to 60 nm. From these facts, it was understood that the particles of the zinc oxide substituted by aluminum were coated with the tin-containing indium oxide substituted by aluminum.

Next, a conductive sheet having a conductive coating film with a thickness of 3 μm (in the dried state) formed on its surface was manufactured using the composite indium oxide particles, in the same manner as in Example 1.

COMPARATIVE EXAMPLE 1

In the course of the synthesis of the composite indium oxide particles of Example 1, a solution of indium chloride was added dropwise to an alkaline solution containing tin chloride previously dissolved therein, and the resultant hydrate or hydroxide containing tin and indium was aged and subjected to a hydrothermal treatment, and then was filtered, washed, dried, treated by heating and reduced in the same manners as in Example 1, to obtain tin-containing indium oxide particles.

The composition of the tin-containing indium oxide particles was confirmed from the result of the X-ray diffraction. The particles were observed with a transmission electron microscope, and were found to be rectangular plate-shaped particles having particle sizes of 40 to 70 nm. The content of tin found by the fluorescent X-ray analysis was 10 mol %.

Next, a conductive sheet having a conductive coating film with a thickness of 3 μm (in the dried state) formed on its surface was manufactured using these particles, in the same manner as in Example 1.

COMPARATIVE EXAMPLE 2

An aqueous alkaline solution was prepared by dissolving sodium hydroxide (53 g) in water (640 ml). Separately, an aqueous solution of zinc chloride was prepared by dissolving zinc chloride (90 g) in water (320 ml). The solution of zinc chloride was added dropwise to the former aqueous alkaline solution to form precipitates containing a hydroxide or hydrate of zinc. The pH of the precipitates was 12.3. The precipitates in the form of a suspension were aged at a room temperature for about 20 hours, and then, an aqueous solution of sodium hydroxide was added to readjust the pH of the suspension to 12.5. This suspension was charged in an autoclave and subjected to a hydrothermal treatment at 180° C. for 4 hours. The product obtained by the hydrothermal treatment was filtered and washed until the pH of the product reached 7.8. This product was dried at 90° C. in an air, and then was slightly crushed in a mortar and treated by heating at 600° C. in an air for 2 hours. Thus, zinc oxide particles were obtained.

Next, the resultant zinc oxide particles were mixed with the tin-containing indium oxide particles obtained in Comparative Example 1, in a molar ratio of 1:1, to obtain mixed powder of the zinc oxide particles and the tin-containing indium oxide particles. The contents of the constitutive elements found by the fluorescent X-ray analysis were similar to the results of Example 1.

Then, a conductive sheet having a conductive coating film with a thickness of 3 μm (in the dried state) formed on its surface was manufactured using the above mixed powder, in the same manner as in Example 1.

COMPARATIVE EXAMPLE 3

In the course of the synthesis of the composite indium oxide particles of Example 1, an aqueous alkaline solution was prepared without dissolving tin chloride in the alkaline solution. Except for this step, composite indium oxide particles were manufactured in the same manners as in Example 1, that is, precipitates containing zinc oxide coated with a hydroxide or hydrate of indium were formed, aged and subjected to a hydrothermal treatment, and the resultant product was filtered, washed, dried, treated by heating and reduced to obtain the composite indium oxide particles. It is considered that the composition of this particle is represented by the formula: $(ZnO)_{0.5}(InO_{3/2})_{0.5}$ deduced from the charged amounts. The content of zinc in the particle, found by the fluorescent X-ray analysis, was 50 mol %.

The composite indium oxide particles were observed with a transmission electron microscope, and it was found that the particles had uniform shapes having particle sizes of 20 to 30 nm. The X-ray diffraction spectrum of the composite indium oxide particles was obtained, and it was found that the particle comprised two phases of zinc oxide and indium oxide.

Next, a conductive sheet having a conductive coating film with a thickness of 3 μm (in the dried state) formed on its surface was manufactured using the composite indium oxide particles, in the same manner as in Example 1.

COMPARATIVE EXAMPLE 4

In the course of the synthesis of the composite indium oxide particles of Example 1, an aqueous alkaline solution was prepared by mixing with zinc oxide substituted by aluminum (40 mol %) instead of the zinc oxide, and further mixing with aluminum hydroxide (3.2 g). Except for this step, particles were manufactured in the same manners as in Example 1, that is, precipitates containing the zinc oxide substituted by aluminum, coated with a hydroxide or hydrate of tin and indium, were formed, washed with water, filtered, dried, treated by heating, and reduced to obtain the particles. The composition of this particle is represented by the formula: $[(Zn_{0.6}Al_{0.4})O]_{0.5}[(ITO)_{0.6}Al_{0.4}]_{0.5}$ deduced from the charged amounts. The contents of zinc, aluminum and tin, found by the fluorescent X-ray analysis, were 30 mol %, 40 mol % and 3 mol %, respectively, and the content of tin in ITO was 10 mol %.

The X-ray diffraction spectrum of the particles was obtained, and it was found that the particle comprised three separated phases of the tin-containing indium oxide, the zinc oxide substituted by aluminum, and additionally, γ-aluminum oxide. The particles were observed with a transmission electron microscope, and it was found that the particles comprised the particles having particle sizes of 20 to 30 nm as in Example 1, mixed with rectangular plate-shaped particles of, seemingly, aluminum oxide having particle sizes of 40 to 50 nm.

Next, a conductive sheet having a conductive coating film with a thickness of 3 μm (in the dried state) formed on its surface was manufactured using these particles, in the same manner as in Example 1.

The structures of the particles obtained in Examples and Comparative Examples are shown in Table 1.

TABLE 1

| | Inner substance/ Coating substance | Inner substance | Composition of inner substance: Al/Zn | Coating substance | Composition of coating substance Al/Sn/In |
|---|---|---|---|---|---|
| Ex. 1 | 50/50 | ZnO | 0/100 | ITO*[1] | 0/10/90 |
| Ex. 2 | 50/50 | AZO*[2] | 10/90 | ITO | 0/10/90 |
| Ex. 3 | 20/80 | AZO | 10/90 | ITO | 0/10/90 |
| Ex. 4 | 50/50 | ZnO | 0/100 | Al-ITO*[3] | 4/9.6/86.4 |
| Ex. 5 | 50/50 | AZO | 10/90 | Al-ITO | 4/9.6/86.4 |
| Ex. 6 | 20/80 | AZO | 10/90 | Al-ITO | 4/9.6/86.4 |
| Ex. 7 | 50/50 | ZnO | 0/100 | ITO | 0/10/90 |
| Ex. 8 | 50/50 | AZO | 10/90 | Al-ITO | 4/9.6/86.4 |
| Ex. 9 | 20/80 | AZO | 10/90 | Al-ITO | 4/9.6/86.4 |
| C. Ex. 1 | | | | ITO (Al/Sn/In = 0/10/90) | |
| C. Ex. 2 | | | Mixed powder of ZnO (Al/Zn = 0/100) and ITO (Al/Sn/In = 0/10/90) | | |
| C. Ex. 3 | 50/50 | ZnO | 0/100 | In$_2$O$_3$ | 0/0/100 |
| C. Ex. 4 | 50/50 | AZO | 40/60 | Al-ITO | 40/6/54 |

Notes:
*[1]ITO: Tin-containing indium oxide
*[2]AZO: Zinc oxide elementarily substituted by aluminum ($Zn_{1-x}Al_xO$)
*[3]Al-ITO: Tin-containing indium oxide elementarily substituted by aluminum <Evaluation>

(Volume Resistivity of Powder)

The volume resistivities of the particles obtained in Examples and Comparative Examples were evaluated. The volume resistivity was measured by the four-probe method, using RORESTA PA system (MCP-PD41 model manufactured by Mitsubishi Chemical Corporation). The conditions for the measurement were as follows:

Density of particles: 2.7 g/cm$^3$
Inner diameter of a container: 2 cm
Distance between probes: 3 mm (Surface Resistivity of Coating Film)

The surface resistivities of the conductive coating films of the conductive sheets obtained in Examples and Comparative Examples were evaluated according to JIS K7194-1994. The surface resistivity was measured by the four-terminal method, using RORESTA PA system (MCP-PD41 model manufactured by Mitsubishi Chemical Corporation).

(Transmittance of Coating Film)

Figure 4:
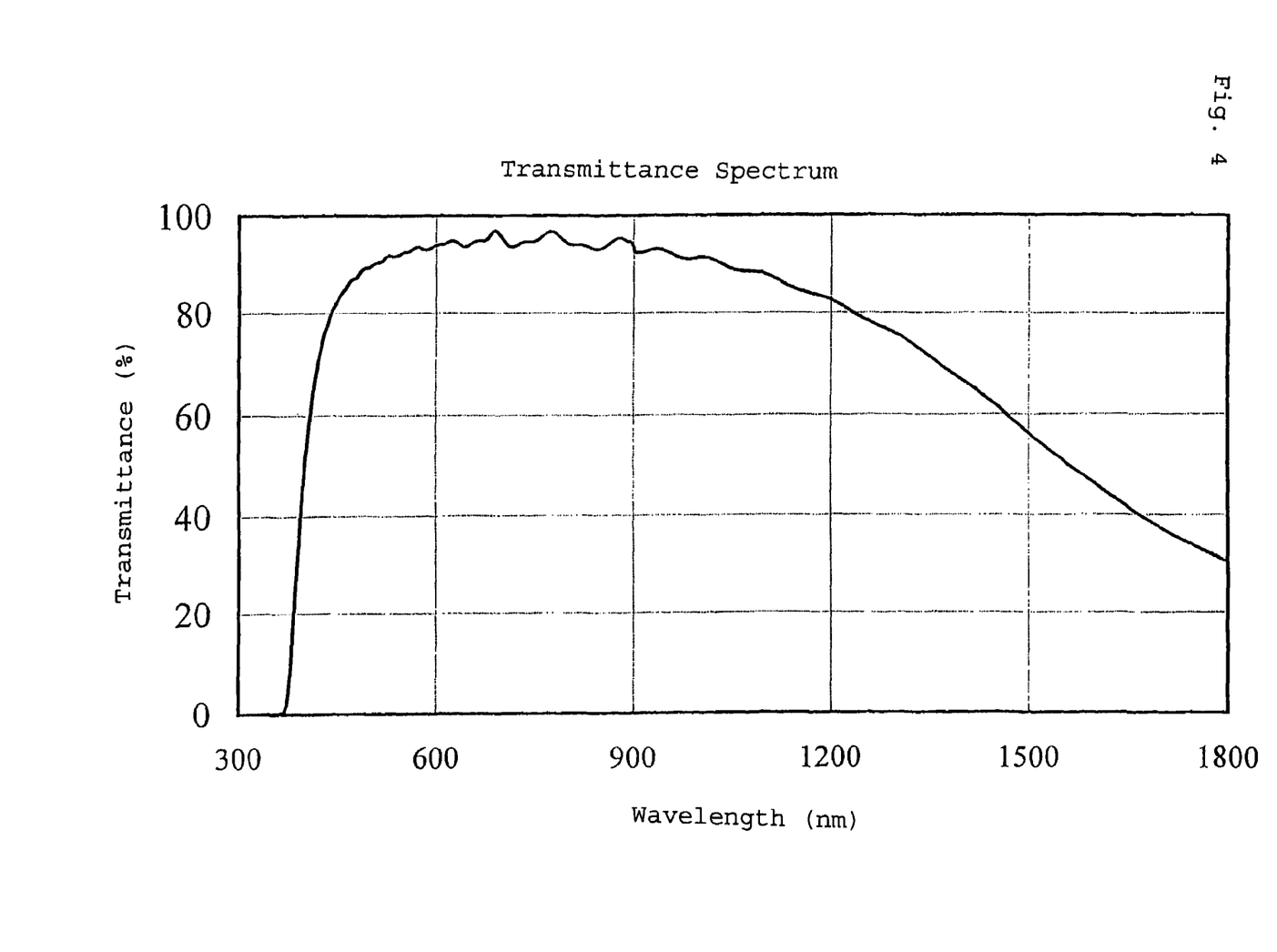
FIG. 4 shows the spectrum of light transmission (wavelength: 200 to 2,500 nm) of the composite particles of zinc oxide and tin-containing indium oxide, obtained in Example 5, which contained zinc oxide at a concentration of 45 mol % and aluminum at a concentration of 7 mol %.

To evaluate the wavelength dependency of the transmittance, the spectrum of the transmittance of the conductive film obtained in Example 5 within a wavelength range of 200 to 2,500 nm was measured with a spectrophotometer ("Ubest V-570 model" manufactured by Jasco). This spectrum of transmittance is shown in FIG. 4.

Further, the spectral of the transmittance of the conductive films of the conductive sheets obtained in Examples and Comparative Examples were measured in the same manner as above within a wavelength range of 200 to 2,500 nm, and the values of the transmittance of the coating films at a wavelength of 350 nm were read from the spectrum of transmittance.

Table 2 shows the results of the above measurements. According to Table 2, the smaller the value of the volume resistivity, the higher conductivity the particles have, which indicates the excellence of the resultant coating film as a conductive film. Table 2 further shows that, the smaller the value of the UV transmittance (indicated by "transmittance at 350 nm" in Table 2), the higher UV-shielding effect the coating film has. Therefore, a coating film smaller both in volume resistivity and UV transmittance has superior characteristics.

TABLE 2

Composite indium oxide particle
$[(Zn_{1-y}Al_yO)]_{1-x}[(ITO)_{1-z}Al_z]_x$

| | Content of ZnO or AZO (1 − x) (mol %) | Content of Zn in particle (mol %) | Content of Al in particle (mol %) | pH during hydrothermal treatment | Particle size (nm) | Volume resistivity (Ωcm) | Surface resistivity (Ω/□) | Transmittance at 350 nm (%) |
|---|---|---|---|---|---|---|---|---|
| Ex. 1 | 50 | 50 | 0 | 10 | 20-30 | $9.9 \times 10^{-1}$ | $1.3 \times 10^6$ | 0.05 |
| Ex. 2 | 50 | 45 | 5 | 10 | 20-30 | $5.4 \times 10^{-1}$ | $5.6 \times 10^5$ | 0.03 |
| Ex. 3 | 20 | 18 | 2 | 10 | 20-30 | $1.8 \times 10^{-1}$ | $8.1 \times 10^4$ | 1.15 |
| Ex. 4 | 50 | 50 | 2 | 10 | 20-30 | $5.1 \times 10^{-1}$ | $5.2 \times 10^5$ | 0.06 |
| Ex. 5 | 50 | 45 | 7 | 10 | 20-30 | $2.4 \times 10^{-1}$ | $1.7 \times 10^5$ | 0.02 |
| Ex. 6 | 20 | 18 | 5.2 | 10 | 20-30 | $9.8 \times 10^{-2}$ | $4.1 \times 10^4$ | 1.21 |
| Ex. 7 | 50 | 50 | 0 | 10 | 50-60 | 1.12 | $2.5 \times 10^6$ | 0.05 |
| Ex. 8 | 50 | 45 | 7 | 5 | 40-50 | $8.2 \times 10^{-2}$ | $1.5 \times 10^4$ | 0.12 |
| Ex. 9 | 20 | 18 | 5.2 | 5 | 40-60 | $7.3 \times 10^{-3}$ | $5.2 \times 10^3$ | 1.05 |
| C. Ex. 1 | 0 | 0 | 0 | 10 | 40-70 | $1.5 \times 10^{-1}$ | $4.3 \times 10^4$ | 86.7 |
| C. Ex. 2 | 50 | 50 | 0 | — | 20-70 | $1.6 \times 10^1$ | $>10^7$ | 1.54 |
| C. Ex. 3 | 50* | 50 | 0 | 10 | 20-30 | $7.6 \times 10^5$ | $>10^7$ | 0.03 |
| C. Ex. 4 | 50 | 30 | 40 | 10 | 20-50 | 8.1 | $>10^7$ | 0.83 |

Note)
*The composite particle of Comparative Example 3 contained no tin, since the composition thereof comprised $(In_2O_3)_{1/2}$ but not ITO.

As can be seen from Table 2, the composite indium oxide particles obtained in Examples exhibit UV-shielding effects because of the zinc oxides contained therein, as compared with the tin-containing indium oxide particles obtained in Comparative Example 1.

In addition, the composite indium oxide particles obtained in Examples do not show so significant difference in UV-shielding effect, but show remarkably higher values in conductivity, as compared with the simply mixed particles of the tin-containing indium oxide particles and the zinc oxide particles obtained in Comparative Example 2, the composite indium oxide particles containing no tin obtained in Comparative Example 3, and the mixture of the aluminum oxide particles and the composite indium oxide particles obtained in Comparative Example 4. This is because, since the indium oxide and the zinc oxide are not compounded but are independently present in the particles of Comparative Example 2, the zinc oxide as an insulating substance hinders the electrical conduction among the particles, with the result that the conductivity of the particles is inferior to the composite indium oxide particles obtained in Examples.

Regarding Comparative Example 3, the indium oxide is not substituted by tin, and therefore, the indium oxide as a coating substance does not exhibit conductivity, which leads to no conductivity of the resultant particles.

Regarding Comparative Example 4, the amount of aluminum used for the substitution is too large, and therefore, an excess of aluminum deposits as aluminum oxide and impairs the conductivity of the particles. On the other hand, in any of the composite particles of Examples, the tin-containing indium oxide coats the zinc oxide to inhibit heterogeneous particles from hindering the electrical conduction, and thus, electrical conduction is possible among the particles by allowing an electrical current to passing along the tin-containing indium oxide on the surfaces of the particles. Further, by the substitution with an appropriate amount of aluminum, it becomes possible for the composite particles of Examples to maintain the conductivity to be equal to or higher than that of the conventional simple tin-containing indium oxide particles (Comparative Example 1).

The invention claimed is:

1. A composite indium oxide particle which has an average particle size of 5 to 100 mu and which comprises zinc oxide and tin-containing indium oxide.

2. The composite indium oxide particle according to claim 1, wherein the content of zinc oxide is 5 to 70 mol %.

3. The composite indium oxide particle according to claim 1, wherein the content of tin in the tin-containing indium oxide phase is 3 to 30 mol %.

4. The composite indium oxide particle according to claim 1, wherein a part of a metal element contained in at least one of zinc oxide and tin-containing indium oxide is substituted by at least one element selected from the group consisting of aluminum and gallium.

5. The composite indium oxide particle according to claim 4, wherein the content of at least one element selected from the group consisting of aluminum and gallium is no more than 30 mol %.

6. The composite indium oxide particle according to claim 4, wherein a part of the zinc atom in zinc oxide is substituted by at least one element selected from the group consisting of aluminum and gallium, and wherein the content of the substituting element is no more than 30 mol % based on the mole of the zinc element in the zinc oxide phase.

7. The composite indium oxide particle according to claim 4, wherein a part of the tin atom or the indium atom in tin-containing indium oxide is substituted by at least one element selected from the group consisting of aluminum and gallium, and wherein the content of the substituting element is no more than 10 mol % based on the total mole of the tin element and the indium element in the tin-containing indium oxide phase.

8. The composite indium oxide particle according to claim 4, wherein a part of the zinc atom in zinc oxide is substituted by at least one element selected from the group consisting of aluminum and gallium, and wherein the content of the substituting element is 2 to 15 mol % based on the mole of the zinc element in the zinc oxide phase.

9. The composite indium oxide particle according to claim 4, wherein a part of the tin atom or the indium atom in tin-containing indium oxide is substituted by at least one element selected from the group consisting of aluminum and gallium, and wherein the content of the substituting element is 2 to 5 mol % based on the total mole of the tin element and the indium element in the tin-containing indium oxide phase.

10. A conductive coating composition comprising the indium oxide particle according to claim 1, a binder and a solvent.

11. A conductive coating film formed by applying the conductive coating composition according to claim 10 by a coating method, and drying the resulting coating layer.

12. A conductive sheet comprising a sheet-form substrate, and a transparent conductive coating film formed on the substrate, wherein the conductive coating film comprises the composite indium oxide particle according to claim 1.

13. A composite indium oxide particle which has an average particle size of 5 to 100 nm and which comprises zinc oxide and tin-containing indium oxide maintaining crystalline structures, respectively, characterized in that the volume resistivity of said particles compressed under a pressure of 14.7 MPa (150 Kgf/cm$^2$ is $10^{-3}$ to 10 $\Omega$cm.

14. The composite indium oxide particle according to claim 1 or 13, wherein zinc oxide is coated with tin-containing indium oxide.

15. A process for manufacturing composite indium oxide particles, comprising the steps of:
adding a zinc compound which comprises zinc as a main component to an aqueous alkaline solution containing a tin salt dissolved therein,
adding an aqueous solution of an indium salt to the aqueous solution of the tin salt containing the zinc compound to form precipitates containing a hydroxide or hydrate of tin and indium,
adjusting a pH of a suspension containing the precipitates to 4 to 12,
treating the suspension by heating at a temperature of 110 to 300° C. in the presence of water,
filtering and drying the resultant product,
treating the product by heating at a temperature of 300 to 1,000° C. in an air, and
treating the product by heating at a temperature of 150 to 400° C. in a reducing atmosphere.

16. The process according to claim 15, wherein at least one compound selected from the group consisting of aluminum compounds and gallium compounds is added to the aqueous solution of the tin salt which contains the zinc compound, in the step of adding the aqueous is solution of the indium salt to said aqueous solution of the tin salt which contains the zinc compound.

* * * * *